(12) United States Patent
Hickerson et al.

(10) Patent No.: US 8,479,173 B2
(45) Date of Patent: Jul. 2, 2013

(54) EFFICIENT AND SELF-BALANCING VERIFICATION OF MULTI-THREADED MICROPROCESSORS

(75) Inventors: Bryan G. Hickerson, Cedar Park, TX (US); John M. Ludden, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 1392 days.

(21) Appl. No.: 12/169,677

(22) Filed: Jul. 9, 2008

(65) Prior Publication Data
US 2010/0011345 A1   Jan. 14, 2010

(51) Int. Cl.
*G06F 9/44* (2006.01)

(52) U.S. Cl.
USPC .......................................................... 717/135

(58) Field of Classification Search
None
See application file for complete search history.

(56) References Cited

U.S. PATENT DOCUMENTS

| | | | |
|---|---|---|---|
| 6,157,940 A * | 12/2000 | Marullo et al. | 703/27 |
| 6,202,174 B1 * | 3/2001 | Lee et al. | 714/38.11 |
| 7,155,600 B2 | 12/2006 | Burky et al. | |
| 7,318,218 B2 * | 1/2008 | Aguilar et al. | 717/124 |
| 7,371,210 B2 * | 5/2008 | Brock et al. | 600/114 |
| 7,630,862 B2 * | 12/2009 | Glas et al. | 702/186 |
| 7,819,884 B2 * | 10/2010 | Lee et al. | 606/130 |
| 2003/0023834 A1 | 1/2003 | Kalafatis et al. | |
| 2003/0084269 A1 | 5/2003 | Drysdale et al. | |
| 2005/0086565 A1 | 4/2005 | Thompson et al. | |
| 2006/0161897 A1 | 7/2006 | Biberstein et al. | |
| 2006/0168497 A1 | 7/2006 | Xiao et al. | |
| 2006/0230392 A1 | 10/2006 | Duale et al. | |
| 2007/0010975 A1 | 1/2007 | Fine et al. | |
| 2007/0162894 A1 | 7/2007 | Noller et al. | |
| 2008/0052725 A1 | 2/2008 | Stoodley et al. | |

FOREIGN PATENT DOCUMENTS

WO   WO 2008093224 A2 *   8/2008

OTHER PUBLICATIONS

David Burns, "Pre-Silicon Validation of Hyper-Threading Technology", Intel Corporation, ftp://download.intel.com/technology/itj/2002/volume06issue01/art02_presilicon/vol6iss1_art02.pdf, 2002, pp. 1-6.
Bruno et al., "Verifying the TriCore2 Multithreaded Microprocessor", IFX AIM BRS TC2 verification, Jun. 2006, 10 pages.
Victor et al., "Functional verification of the POWER5 microprocessor and POWER5 multiprocessor systems", IBM Journal of Res. & Dev., vol. 49, No. 4/5, Jul./Sep. 2005, pp. 541-553.

* cited by examiner

*Primary Examiner* — Li B Zhen
*Assistant Examiner* — Evral Bodden
(74) *Attorney, Agent, or Firm* — Francis Lammes; Stephen J. Walder, Jr.; Diana R. Gerhardt

(57) ABSTRACT

Creating one or more irritator threads on one or more processor cores in a multi-threaded multiprocessor data processing system is provided. A test generator generates non-irritator thread code for execution by a non-irritator thread and irritator thread code for execution by one or more irritator threads of the multi-threaded multiprocessor data processing system. A simulation controller instantiates the non-irritator thread to execute the non-irritator thread code and the one or more irritator threads to execute the irritator thread code. The simulation controller determines if the non-irritator thread has finished execution of the entire instruction stream of the non-irritator thread code. Responsive to the non-irritator thread finishing execution of the entire instruction stream of the non-irritator thread code, the non-irritator thread performs an operation to terminate the execution of the irritator thread code by the one or more irritator threads.

15 Claims, 4 Drawing Sheets

EFFICIENT AND SELF-BALANCING VERIFICATION OF MULTI-THREADED MICROPROCESSORS

GOVERNMENT RIGHTS

This invention was made with United States Government support under Agreement No. HR0011-07-9-0002 awarded by DARPA. The Government has certain rights in the invention.

BACKGROUND OF THE INVENTION

1. Field of the Invention

The present application relates generally to an improved data processing apparatus and method and more specifically to an apparatus and method for performing an efficient and self-balancing verification of multi-threaded microprocessors.

2. Background of the Invention

A microprocessor is the heart of a modern computer. A microprocessor is a chip made up of millions of transistors and other elements organized into specific functional operating units, including arithmetic units, cache memory and memory management, predictive logic and data movement.

Processors in modern computers have grown tremendously in performance, capabilities, and complexity over the past decade. One exemplary performance improvement in modern computers is the ability to multi-thread. Any computer program consists of many instructions for operating on data. Each of these instructions may be split into two or more simultaneously (or pseudo-simultaneously) running tasks or threads. Multithreading generally occurs by time-division multiplexing ("time slicing") in very much the same way as the parallel execution of multiple tasks (computer multitasking): the processor switches between different threads. This context switching can happen so fast as to give the illusion of simultaneity to an end user. On a multiprocessor or multi-core system, threading can be achieved via multiprocessing, wherein different threads and processes can run literally simultaneously on different processors or cores.

In order to verify multi-threaded microprocessors, there are several problems which are difficult to solve, such as balancing the length of instruction streams, achieving a desired cross thread interaction, and efficient test generation. In order to balance the length of the instruction streams running on all threads such that they are roughly the same length so that in simulation or on real hardware, multiple instruction streams must be run for the majority of the test case. Creating such multiple instruction streams that are independent of one another is often a difficult task. While one approach might be to synchronize all of the threads prior to starting the test and at different points while running the tests by inserting synchronization routines into the test, the synchronization of all of the threads has a drawback though spending most of the test in the synchronization routines instead of the body of the test and therefore reduces the probability of finding design bugs.

The same holds true with trying to achieve the desired cross thread interactions. That is, lining up the instructions on one thread relative to instructions on another thread can also require spending most of the test in the lining up the instructions instead of the body of the test and therefore reduces the probability of finding design bugs. Under normal circumstances, for each additional thread that is part of the verification process the time required to generate an efficient test increases at least linearly. So, if a multi-threading test is being run on a simulator or real hardware, where the overhead of simulating additional threads does not increase at least linearly, then the time spent generating the test is growing faster (possibly significantly faster) than the simulation time. The net result is that test generation can become a bottleneck to the verification process.

BRIEF SUMMARY OF THE INVENTION

In one illustrative embodiment, a method, in a data processing system, is provided for creating one or more irritator threads on one or more processor cores in a multi-threaded multiprocessor data processing system. The illustrative embodiments generate non-irritator thread code for execution by a non-irritator thread and irritator thread code for execution by one or more irritator threads of the multi-threaded multiprocessor data processing system. The illustrative embodiments instantiate the non-irritator thread to execute the non-irritator thread code and the one or more irritator threads to execute the irritator thread code. The illustrative embodiments determine if the non-irritator thread has finished execution of the entire instruction stream of the non-irritator thread code and, responsive to the non-irritator thread finishing execution of the entire instruction stream of the non-irritator thread code, the illustrative embodiments perform an operation to terminate the execution of the irritator thread code by the one or more irritator threads.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
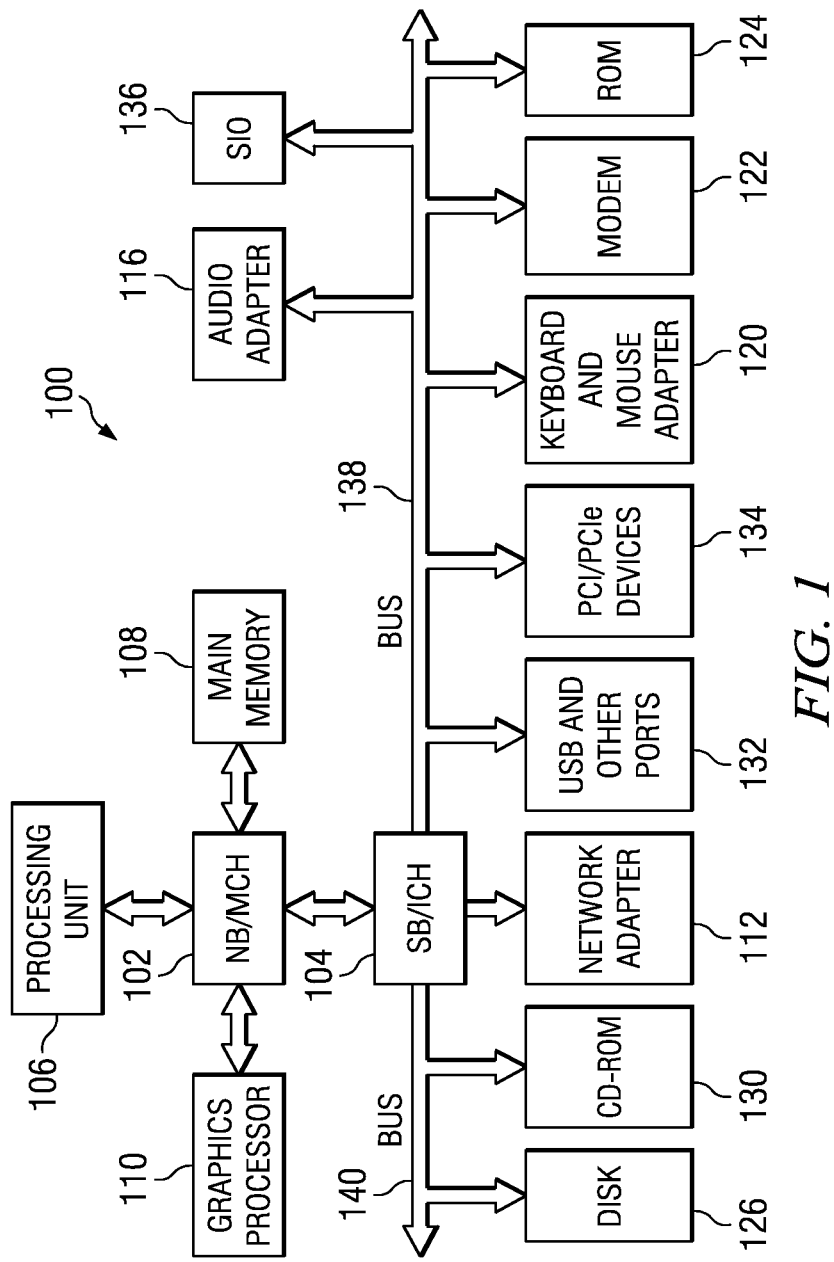
FIG. 1 shows a block diagram of an exemplary data processing system in which aspects of the illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism for generating efficient and self-balancing test cases for multi-threaded microprocessor verification. Thus, the illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as exemplary environments in which exemplary aspects of the illustrative embodiments may be implemented. While the description following FIG. 1 will focus primarily on a single data processing device implementation of a multi-threaded microprocessor verification mechanism, this is only exemplary and is not intended to state or imply any limitation with regard to the features of the present invention. To the contrary, the illustrative embodiments are intended to include distributed data processing environments and embodiments in which multi-threaded microprocessors verification may be performed.

With reference now to the figures and in particular with reference to FIG. 1, an exemplary diagram of data processing environments is provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of an exemplary data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Figure 2:
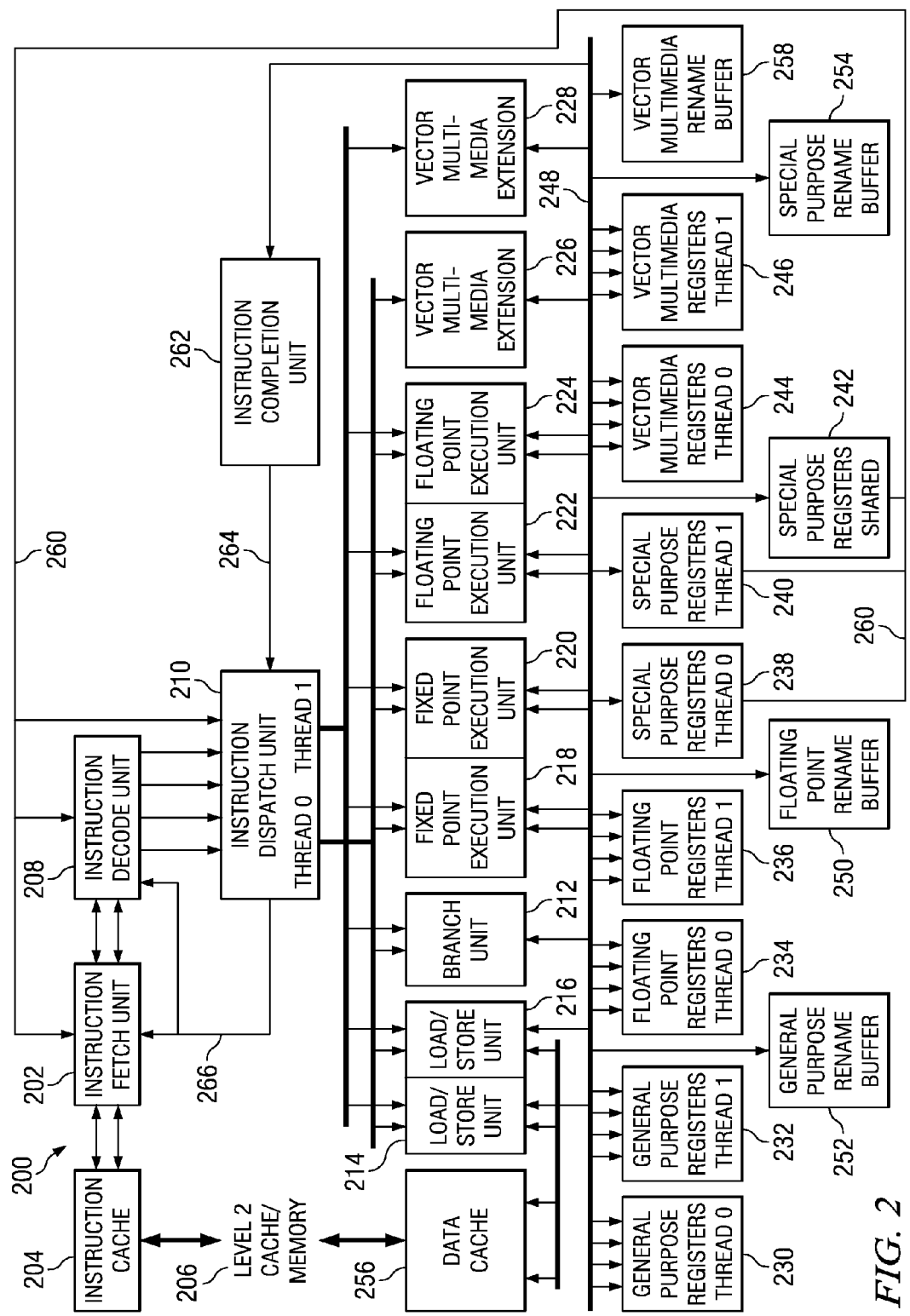
FIG. 2 shows an exemplary block diagram of a conventional dual threaded processor design showing functional units and registers in which aspects of the illustrative embodiments may be implemented.

Referring to FIG. 2, an exemplary block diagram of a conventional dual threaded processor design showing functional units and registers is shown in which aspects of the illustrative embodiments may be implemented. Processor 200 may be implemented as processing unit 102 in FIG. 1 in these illustrative examples. Processor 200 comprises a single integrated circuit superscalar microprocessor with dual-thread simultaneous multi-threading (SMT). Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 can request multiple instructions from instruction cache 204 for up to two threads at the same time. Instruction decode unit 208 decodes multiple instructions for up to two threads at the same time and passes decoded instructions to instruction dispatch unit (IDU) 210. IDU 210 selectively groups decoded instructions from instruction decode unit 208 for each thread, and outputs or issues a group of instructions for each thread to execution units 212, 214, 216, 218, 220, 222, 224, 226, and 228 of the processor.

In an illustrative embodiment, the execution units of the processor may include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246 separately for each of the two threads and by the type of instruction, namely general purpose registers (GPR) 230 and 232, floating-point registers (FPR) 234 and 236, special purpose registers (SPR) 238 and 240 and vector registers (VR) 244 and 246. The processor additionally includes a set of special purpose registers (SPR) 242 for holding program states, such as an instruction pointer, stack pointer, or processor status word, which may be used on instructions from either or both threads. Simplified internal bus structure 248 depicts connections between execution units 212, 214, 216, 218, 220, 222, 224, 226, and 228.

In order to execute a floating-point instruction, FPUA 222 and FPUB 224 retrieves register source operand information, which is input data required to execute an instruction, from FPRs 234 and 236, if the instruction data required to execute the instruction is complete, or from floating-point rename buffer 250, if the instruction data is not complete. Complete data is data that has been generated by an execution unit once an instruction has completed execution and is stored in a register, such as registers 230, 232, 234, 236, 238, 240, 242, 244, and 246. Incomplete data is data that has been generated during instruction execution where the instruction has not completed execution. Incomplete data is stored on rename buffers, such as rename buffer 250, 252, 254, or 258. FPUA 222 and FPUB 224 input their data according to which thread each executing instruction belongs to. For example, FPUA 222 inputs completed data to FPR 234 and FPUB 224 inputs completed data to FPR 236, because FPUA 222 and FPUB 224 and FPRs 234 and 236 are thread specific.

During execution of an instruction, FPUA 222 and FPUB 224 output their destination register operand data, or instruction data generated during execution of the instruction, to floating-point rename buffer 250. The instruction data is later sent to FPRs 234 and 236 when the instruction has completed execution, according to which thread each executing instruction belongs to. In order to execute an instruction, FXUA 218, FXUB 220, LSUA 214, and LSUB 216 retrieve register source operand information from GPRs 230 and 232, if data is complete or from rename buffer 252, if the data is not completed yet. During execution of an instruction, FXUA 218, FXUB 220, LSUA 214, and LSUB 216 output their destination register operand data to rename buffer 252, which is later sent to GPRs 230 and 232 at completion time according to which thread each executing instruction belongs to.

In order to execute some subset of instructions, such as those instructions requiring program states, executed by FXUA 218, FXUB 220, and branch unit 212 use SPRs 238, 240, and 242 as source and destination operand registers when data is complete or use special purpose rename buffer 254 as source and destination operand registers, if the data is not completed yet. During execution of an instruction, FXUA 218, FXUB 220, and branch unit 212 output their destination register operand data to special purpose rename buffer 254, which is later sent to SPRs 238, 240, and 242 at completion time according to which thread each executing instruction belongs to. LSUA 214 and LSUB 216 input their storage operands from and output their storage operands to data cache 256 which stores operand data for multiple programs (threads). In order to execute an instruction, VMXA 226 and VMXB 228 input their register source operand information from VRs 244 and 246, if data is complete, according to which thread each executing instruction belongs to, or from vector multimedia rename buffer 258, if the data is not completed yet. During execution of an instruction, VMXA 226 and VMXB 228 output their destination register operand data to vector multimedia rename buffer 258, which is later sent to VRs 244 and 246 at completion time according to which thread each executing instruction belongs to. Data cache 256 also has an interface to level 2 cache/memory 206.

Data cache 256 may also have associated with it a non-cacheable unit (not shown) which accepts data from the processor and writes it directly to level 2 cache/memory 206, thus bypassing the coherency protocols required for storage to cache.

In response to the instructions input from instruction cache 204 and decoded by instruction decode unit 208, IDU 210 selectively dispatches the instructions to execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed-point mathematical operations on register source operands, such as addition, subtraction, ANDing, ORing and XORing. FPUA 222 and FPUB 224 execute floating-point mathematical operations on register source operands, such as floating-point multiplication and division. LSUA 214 and LSUB 216 execute load and store instructions, which move operand data between data cache 256 and registers 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

IDU 210 groups together instructions that are decoded by instruction decode unit 208 to be executed at the same time, depending on the mix of decoded instructions and available execution units 212, 214, 216, 218, 220, 222, 224, 226, and 228 to perform the required operation for each instruction. For example, because there are only two load/store units 214 and 216, a maximum of two load/store type instructions may be grouped together. In an illustrative embodiment, up to seven instructions may be grouped together (two fixed-point arithmetic, two load/store, two floating-point arithmetic (FPU) or two vector multimedia extension (VMX), and one branch), and up to five instructions may belong to the same thread. IDU 210 includes in the group as many instructions as possible from the higher priority thread, up to five, before including instructions from the lower priority thread. Thread priority is determined by the thread's priority value and the priority class of its process. The processing system uses the base priority level of all executable threads to determine which thread gets the next slice of processor time. Threads are scheduled in a round-robin fashion at each priority level, and only when there are no executable threads at a higher level does scheduling of threads at a lower level take place.

However, IDU 210 dispatches either FPU instructions 222 and 224 or VMX instructions 226 and 228 in the same group with FXU instructions 218 and 220. That is, IDU 210 does not dispatch FPU instructions 222 and 224 and VMX instructions 226 and 228 in the same group. Program states, such as an instruction pointer, stack pointer, or processor status word, stored in SPRs 238 and 240 indicate thread priority 260 to IDU 210.

Instruction completion unit 262 monitors internal bus structure 248 to determine when instructions executing in execution units 212, 214, 216, 218, 220, 222, 224, 226, and 228 are finished writing their operand results to rename buffers 250, 252, 254, or 258. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228 and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 262 monitors for the completion of instructions, and sends control information 264 to IDU 210 to notify IDU 210 that more groups of instructions can be dispatched to execution units 212, 214, 216, 218, 220, 222, 224, 226, and 228. IDU 210 sends dispatch signal 266, which serves as a throttle to bring more instructions down the pipeline to the dispatch unit, to IFU 202 and instruction decode unit 208 to indicate that it is ready to receive more decoded instructions. Processor 200 also employs rename buffers 250, 252, 254, and 258 in order to support data movement. Rename buffers 250, 252, 254, and 258 may also be referred to as rename registers or reorder buffers. Rename buffers 250, 252, 254, and 258 contain: i) data for in-flight instructions, which are instructions that have been sent from the dispatch unit, but have not finished yet; or ii) non-architected data, which is data that has finished, or been produced by the execution units, but has not completed and been placed into a register yet, that is written over internal bus structure 248. Register results from execution units 212, 214, 216, 218, 220, 222, 224, 226, and 228 are held in rename buffers 250, 252, 254, and 258 according to which execution unit the associated instruction belongs to. While the illustrative embodiments indicate that there is one rename buffer for each of registers 230, 232, 234, 236, 238, 240, 242, 244, and 246, one of ordinary skill in the art would understand that any configuration may be employed for associating rename buffers to register sets.

As stated earlier, the verification of multi-threaded microprocessors may often times be difficult. The illustrative embodiments provide a mechanism that creates one or more irritator threads on one or more of the processor cores depending on how many threads each processor core supports simultaneously and a desired verification scenario. The irritator threads may be composed of a short instruction sequence which is contained within the body of an infinite loop. Even though the irritator threads reside in the body of an infinite loop, only one pass of the loop is actually generated to conserve generation time. After the test is generated, the test case is post-processed to change the loop count from a single iteration into a very large (i.e. infinite for all practical purposes) loop count such that when the test runs in simulation or on real hardware, the irritator threads will run indefinitely.

On a non-irritator thread a very random or a very controlled instruction stream may be generated depending solely on the desired verification objective. Once the non-irritator thread has finished executing its entire instruction stream, the non-irritator thread may perform one or more operations that would cause the irritator thread(s) to terminate execution. For example, the non-irritator thread may store a no-op instruction into the instruction streams of each of the irritator threads, turning the branch instruction that created the infinite loop on the irritator threads into a no operation or "no-op" instruction which thereby terminates the irritator threads. Instructions in a loop may be changed while the loop is being executed without the need for any synchronization between the threads.

Alternatively, the irritator thread may be executing code that reads from a specific address until the value in the address equals a specific value. Then once the non-irritator thread has finished executing its entire instruction stream, the non-irritator thread may write the expected value to the address being read by the irritator thread. The result is a efficiently generated multi-threading instruction level test case which guarantees: balanced length of all instruction streams within the test, aggressive cross thread interaction of the desired scenario since the irritator threads are constantly causing the desire affect while the non-irritator thread are running, and efficient test generation since the irritator threads instructions are very short to generate (typically one or two instructions or a short sequence of instructions) which execute indefinitely until the non-irritator thread terminates the irritator threads.

Figure 3:
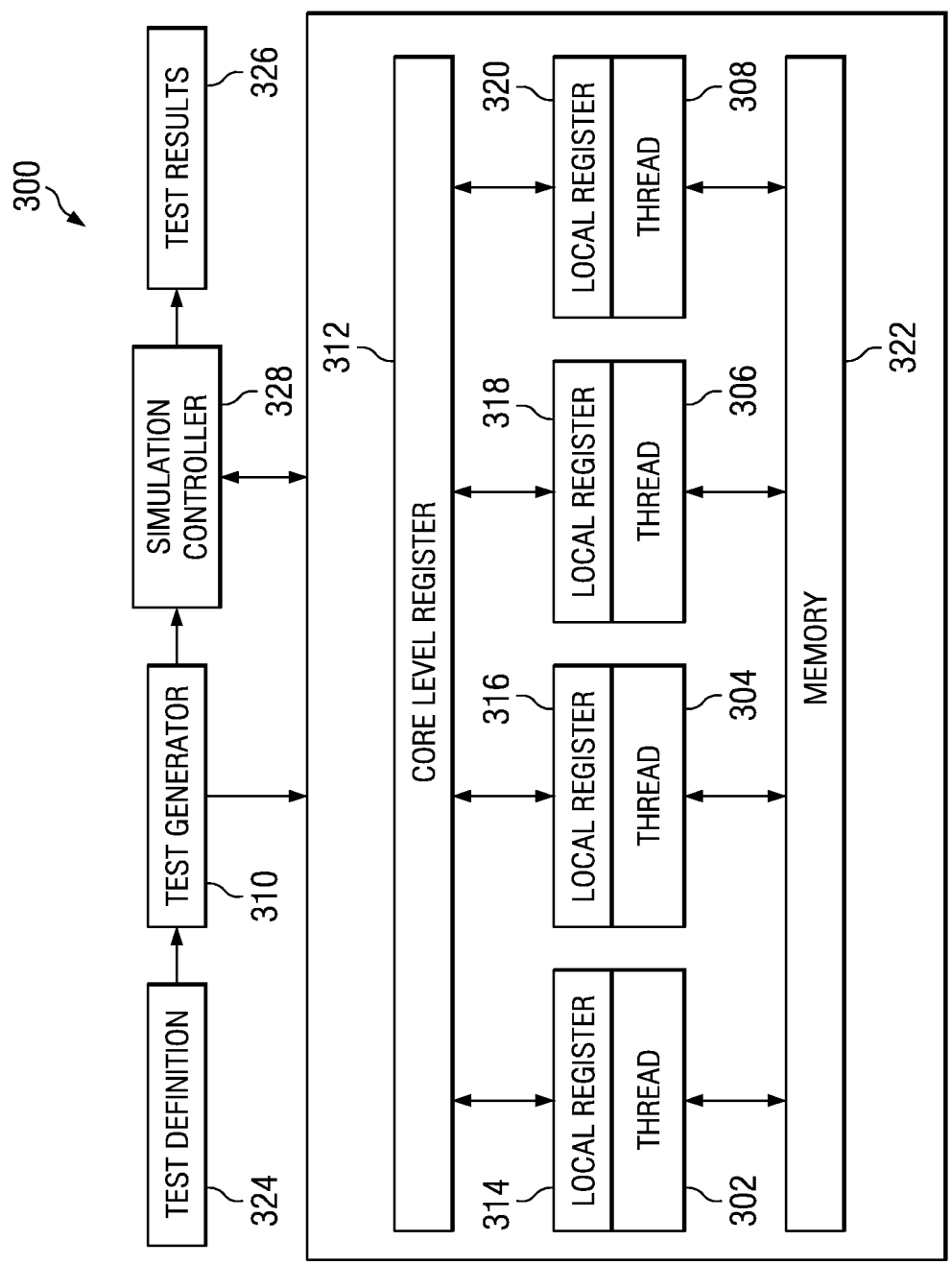
FIG. 3 depicts an exemplary implementation of a multi-threaded microprocessor verification system in accordance with an illustrative embodiment.

FIG. 3 depicts an exemplary implementation of a multi-threaded microprocessor verification system in accordance with an illustrative embodiment. Multi-threaded microprocessor system 300 comprises four threads 302, 304, 306, and 308, each of which is capable of processing instructions generated by test generator 310. While the illustrative embodiments depict four threads, the illustrative embodiments are not limited to four threads. That is, the illustrative embodiments may be implemented in more than four threads or as little as two threads. Threads 302, 304, 306, and 308 have access to common core level register 312 and their own respective local register 314, 316, 318, and 320. Additionally, threads 302, 304, 306, and 308 have access to memory 322.

Once a user, such as a test operator, administrator, or the like, defines test definition 324 that will be used to verify the multi-threading capabilities of multi-threaded multiprocessor system 300, test generator 310 takes test definition 324 and generates non-irritator thread code that will be executed by a non-irritator thread, which for this example, is thread 302. Again, the non-irritator thread code that thread 302 executes may be a very random or a very controlled instruction stream. An exemplary random instruction stream may include a number of random instructions from all possible instructions that the processor understands. An exemplary controlled instruction stream may include an add instruction followed by a multiply instruction followed by a load. Test generator 310 may store the non-irritator thread code for thread 302 in register 314 or in core level register 312.

Test generator 310 also generates irritator thread code to change the loop count from a single iteration of code defined in the test definition 324 into a very large (i.e. infinite for all practical purposes) loop count such that threads 304, 306, and 308 will execute the irritator thread code indefinitely. Again, the code that threads 304, 306, and 308 execute may be composed of a short instruction sequence which is contained within the body of an infinite loop. The irritator thread code is restricted in that the irritator thread code may not cause any unexpected exceptions, may not modify any of memory 322 that is read by thread 302, may not modify any of core level register 312, and any architected results of the execution of the irritator thread code may be undefined. That is, depending on how the irritator thread is written, the illustrative embodiments may not be able to check the architectural results of the irritator threads against simulation test case, as the irritator threads are used to find problems in the non-irritator thread (primarily) whose architected state may be checked on an instruction-by-instruction basis as long as the irritator threads adhere to the described restrictions. Test generator 310 may store the irritator thread code for threads 304, 306, and 308 in registers 316, 318, and 320 or in core level register 312.

Once test generator 310 stores the non-irritator thread code and the irritator thread code, test generator 310 sends a complete test case to simulation controller 328 for execution. Simulation controller 328 loads the test case into a simulation model, such as a Very-High-Speed Integrated Circuits (VHSIC) hardware description language (VHDL) simulation model, a Verilog® simulation model, an Advanced Boolean Equation Language (ABEL™) simulation model, or the like. Simulation controller 328 then begins clocking of the simulator, and instantiates the threads 302, 304, 306, and 308 to execute their respectively assigned code. While threads 304, 306, and 308 execute the irritator thread code, thread 302 executes the non-irritator thread code. Once thread 302 finishes executing the entire instruction stream of non-irritator thread code, thread 302 may perform one of a number of operations that causes threads 304, 306, and 308 to terminate. Thread 302 may store a no-op instruction into the instruction streams of each of the irritator threads, turning the branch instruction that created the infinite loop on the irritator threads into a no operation or "no-op" instruction which thereby terminates the irritator threads or thread 302 may write an expected value to one or more addresses being read by threads 304, 306, and 308, thereby terminating threads 304, 306, and 308.

Simulation controller 328 may monitor the execution of the non-irritator thread code and the irritator thread code by threads 302, 304, 306, and 308. Simulation controller 328 may detect design bugs, such as hang conditions, control logic problems, or the like, which result in a machine check condition, using built-in error detection in the hardware and/or check for other design bugs, such as micro-architectural rule violations, correctness of the non-irritator thread architectural results, or the like, against the predicted results of the test case typically on an instruction-by-instruction basis as is done for single threaded designs using code that runs in simulation of the design. Simulation controller 328 may then return test results 326 to the user.

Figure 4:
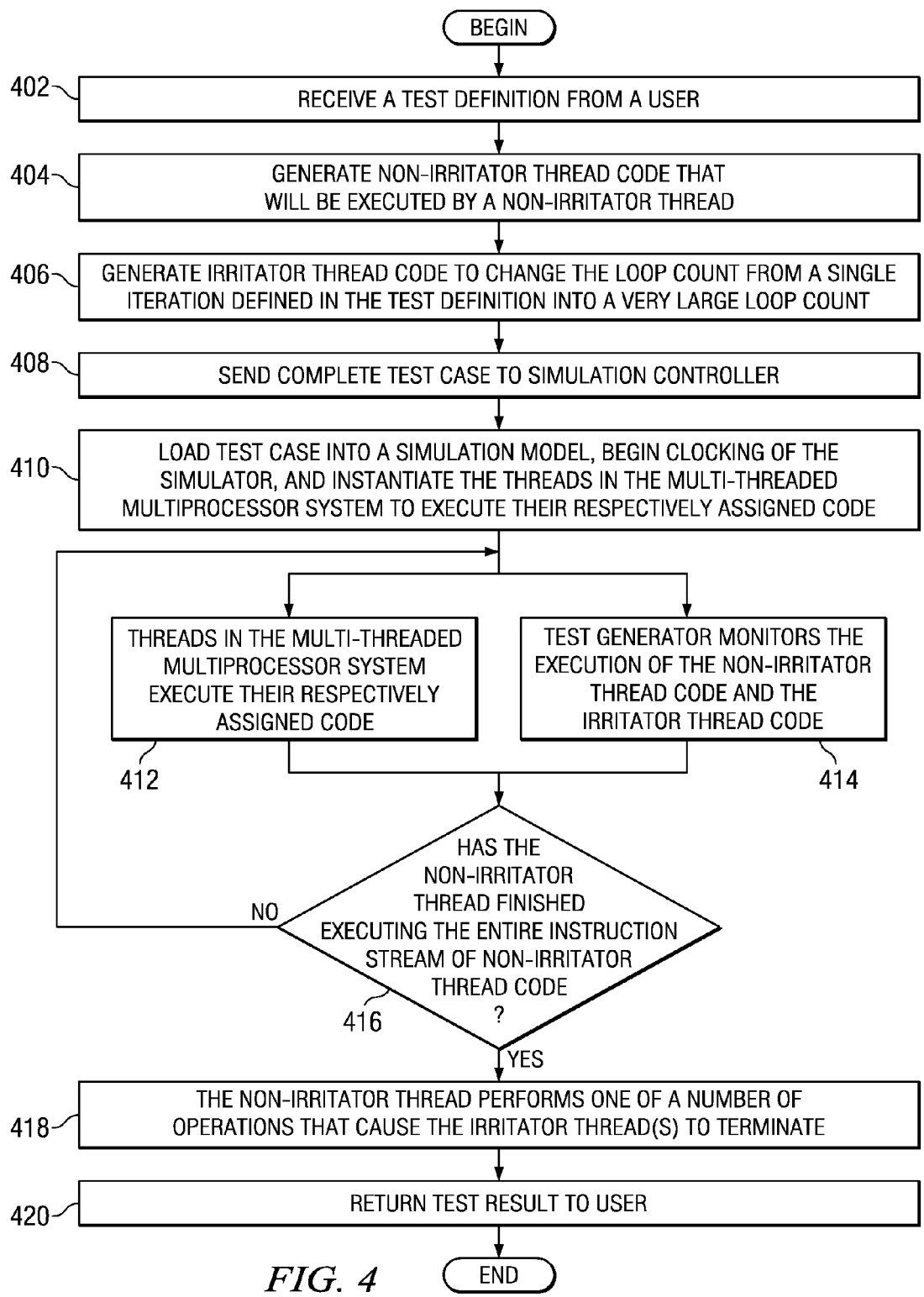
FIG. 4 depicts a flowchart for the operation for multi-threaded microprocessor verification in accordance with an illustrative embodiment.

FIG. 4 depicts a flowchart for the operation for multi-threaded microprocessor verification in accordance with an illustrative embodiment. As the operation begins, a test generator receives a test definition from a user, such as a test operator, administrator, or the like (step 402). The test generator uses the test definition to verify the multi-threading capabilities of a multi-threaded multiprocessor system. The test generator then generates non-irritator thread code that will be executed by a non-irritator thread in the multi-threaded multiprocessor system (step 404). The test generator also generates irritator thread code to change the loop count from a single iteration defined in the test definition into a very large loop count such that irritator threads will execute the irritator thread code indefinitely (step 406).

As the test generator finishes generating and storing the non-irritator thread code and the irritator thread code, the test generator sends a complete test case to a simulation controller for execution (step 408). The simulation controller loads the test case into a simulation model, begins clocking of the simulator, and instantiates the threads in the multi-threaded multiprocessor system to execute their respectively assigned code (step 410). The threads in the multi-threaded processor system then execute their respectively assigned code (step 412) and the simulation controller monitors the execution of the non-irritator thread code and the irritator thread code to record any design bugs that may occur during the execution of the non-irritator thread code and the irritator thread code (step 414).

If the simulation controller determines that the non-irritator code has not finished executing the entire instruction stream of non-irritator thread code (step 416), the operation returns to steps 412 and 414. Once the thread that is executing the non-irritator code finishes executing the entire instruction stream of non-irritator thread code (step 416), the non-irritator thread performs one of a number of operations that cause the thread(s) executing the irritator thread code to terminate (step 418). The simulation controller returns any design bugs that were recorded by the simulation controller as a result of the execution of the non-irritator thread code and the irritator thread code to the user in the form of test results (step 420), with the operation terminating thereafter.

Thus, the illustrative embodiments provide mechanisms for creating one or more irritator threads on one or more processor cores depending on how many threads each processor core supports simultaneously and a desired verification scenario. The irritator threads may be composed of a short instruction sequence which is contained within the body of an infinite loop. After the test is generated, the test case is post-processed to change the loop count from a single iteration into a very large loop count such that when the test runs in simulation or on real hardware, the irritator threads will run indefinitely. On the non-irritator thread a very random or a very controlled instruction stream may be generated depending solely on the desired verification objective. Once the non-irritator thread has finished executing its entire instruction stream, the non-irritator thread may perform one of a number of operations that would cause the irritator thread(s) to terminate execution.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a multi-threaded multiprocessor data processing system, for creating one or more irritator threads on one or more processor cores, the method comprising:
   generating non-irritator thread code for execution by a non-irritator thread of the multi-threaded multiprocessor data processing system;
   generating irritator thread code for execution by one or more irritator threads of the multi-threaded multiprocessor data processing system, wherein the non-irritator thread code is different from the irritator thread code; wherein
   the irritator thread loop has multiple iterations and the non-irritator thread is a random or a controlled instruction stream;
   instantiating the non-irritator thread to execute the non-irritator thread code;
   instantiating the one or more irritator threads to execute the irritator thread code;
   determining whether the non-irritator thread has finished execution of the entire instruction stream of the non-irritator thread code; and
   responsive to the non-irritator thread finishing execution of the entire instruction stream of the non-irritator thread code, performing an operation to terminate the execution of the irritator thread code by the one or more irritator threads, wherein
   the irritator thread code is restricted such that the irritator thread code does not cause any unexpected exceptions, does not modify any of memory that is read by the non-irritator thread, does not modify any core level register, or that any architected results of executing the irritator thread code goes undefined.

2. The method of claim 1, wherein generating the irritator thread code further comprises:
   changing the loop count from a single iteration of code into a very large loop count such that the one or more irritator threads execute the irritator thread code indefinitely.

3. The method of claim 1, wherein performing the operation to terminate the execution of the irritator thread code further comprises:
   storing a no-op instruction into an instruction stream of each of the one or more irritator threads, thereby terminating the one or more irritator threads.

4. The method of claim 1, wherein performing the operation to terminate the execution of the irritator thread code further comprises:
   writing an expected value to one or more addresses being read by the one or more irritator threads, thereby terminating the one or more irritator threads.

5. The method of claim 1, further comprising:
   monitoring the execution of the non-irritator thread code by the non-irritator thread and the irritator thread code by the one or more irritator threads; and
   responsive to the non-irritator thread finishing execution of the entire instruction stream of the non-irritator thread code, generating test results of the execution of the non-irritator thread code by the non-irritator thread and the irritator thread code by the one or more irritator threads.

6. A computer program product comprising a non-transitory computer recordable medium having a computer readable program recorded thereon, wherein the computer readable program, when executed on a computing device, causes the computing device to:
   generate non-irritator thread code for execution by a non-irritator thread of the multi-threaded multiprocessor data processing system;
   generate irritator thread code for execution by one or more irritator threads of the multi-threaded multiprocessor data processing system, wherein the non-irritator thread code is different from the irritator thread code; wherein
   the irritator thread loop has multiple iterations and the non-irritator thread is a random or a controlled instruction stream;
   instantiate the non-irritator thread to execute the non-irritator thread code;
   instantiate the one or more irritator threads to execute the irritator thread code;
   determine whether the non-irritator thread has finished execution of the entire instruction stream of the non-irritator thread code; and
   responsive to the non-irritator thread finishing execution of the entire instruction stream of the non-irritator thread code, perform an operation to terminate the execution of the irritator thread code by the one or more irritator threads, wherein
   the irritator thread code is restricted such that the irritator thread code does not cause any unexpected exceptions, does not modify any of memory that is read by the non-irritator thread, does not modify any core level register, or that any architected results of executing the irritator thread code goes undefined.

7. The computer program product of claim 6, wherein the computer readable program to generate the irritator thread code further causes the computing device to:
   change the loop count from a single iteration of code into a very large loop count such that the one or more irritator threads execute the irritator thread code indefinitely.

8. The computer program product of claim 6, wherein the computer readable program to perform the operation to terminate the execution of the irritator thread code further causes the computing device to:
   store a no-op instruction into an instruction stream of each of the one or more irritator threads, thereby terminating the one or more irritator threads.

9. The computer program product of claim 6, wherein the computer readable program to perform the operation to terminate the execution of the irritator thread code further causes the computing device to:
   write an expected value to one or more addresses being read by the one or more irritator threads, thereby terminating the one or more irritator threads.

10. The computer program product of claim 6, wherein the computer readable program further causes the computing device to:
    monitor the execution of the non-irritator thread code by the non-irritator thread and the irritator thread code by the one or more irritator threads; and responsive to the non-irritator thread finishing execution of the entire instruction stream of the non-irritator thread code, generate test results of the execution of the non-irritator thread code by the non-irritator thread and the irritator thread code by the one or more irritator threads.

11. An apparatus, comprising:
a processor; and
a memory coupled to the processor, wherein the memory comprises instructions which, when executed by the processor, cause the processor to:
generate non-irritator thread code for execution by a non-irritator thread of the multi-threaded multiprocessor data processing system;
generate irritator thread code for execution by one or more irritator threads of the multi-threaded multiprocessor data processing system; wherein the non-irritator thread code is different from the irritator thread code; wherein
the irritator thread loop has multiple iterations and the non-irritator thread is a random or a controlled instruction stream;
instantiate the non-irritator thread to execute the non-irritator thread code;
instantiate the one or more irritator threads to execute the irritator thread code;
determine whether the non-irritator thread has finished execution of the entire instruction stream of the non-irritator thread code; and
responsive to the non-irritator thread finishing execution of the entire instruction stream of the non-irritator thread code, perform an operation to terminate the execution of the irritator thread code by the one or more irritator threads, wherein
the irritator thread code is restricted such that the irritator thread code does not cause any unexpected exceptions, does not modify any of memory that is read by the non-irritator thread, does not modify any core level register, or that any architected results of executing the irritator thread code goes undefined.

12. The apparatus of claim 11, wherein the instructions to generate the irritator thread code further cause the processor to:
change the loop count from a single iteration of code into a very large loop count such that the one or more irritator threads execute the irritator thread code indefinitely.

13. The apparatus of claim 11, wherein the instructions to perform the operation to terminate the execution of the irritator thread code further cause the processor to:
store a no-op instruction into an instruction stream of each of the one or more irritator threads, thereby terminating the one or more irritator threads.

14. The apparatus of claim 11, wherein the instructions to perform the operation to terminate the execution of the irritator thread code further cause the processor to:
write an expected value to one or more addresses being read by the one or more irritator threads, thereby terminating the one or more irritator threads.

15. The apparatus of claim 11, wherein the instructions further cause the processor to:
monitor the execution of the non-irritator thread code by the non-irritator thread and the irritator thread code by the one or more irritator threads; and
responsive to the non-irritator thread finishing execution of the entire instruction stream of the non-irritator thread code, generate test results of the execution of the non-irritator thread code by the non-irritator thread and the irritator thread code by the one or more irritator threads.

* * * * *